Figure 3:
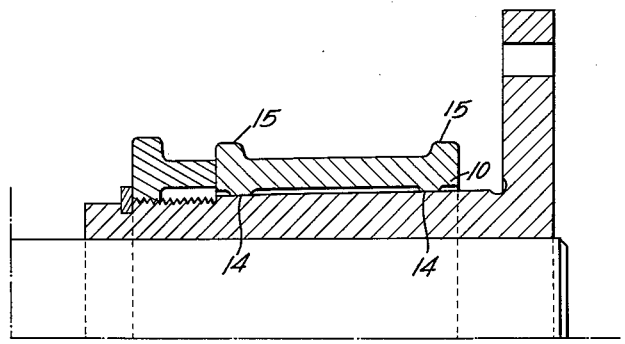

Nov. 13, 1962  K. E. J. KYLEN  3,063,743
PRESS FITTING JOINT
Filed Feb. 19, 1959  3 Sheets-Sheet 1
FIG. I.
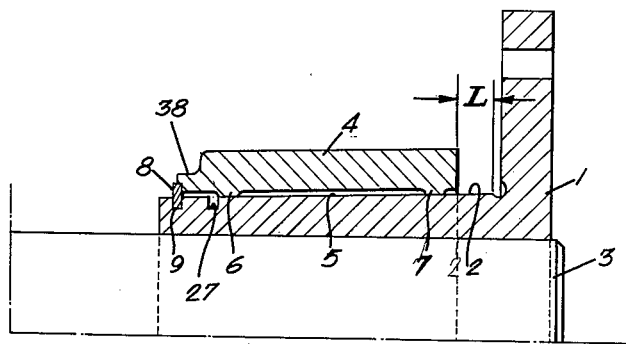
FIG. 1ª
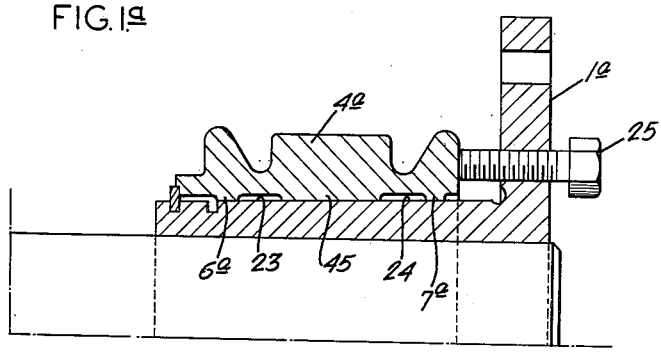
FIG. 2.
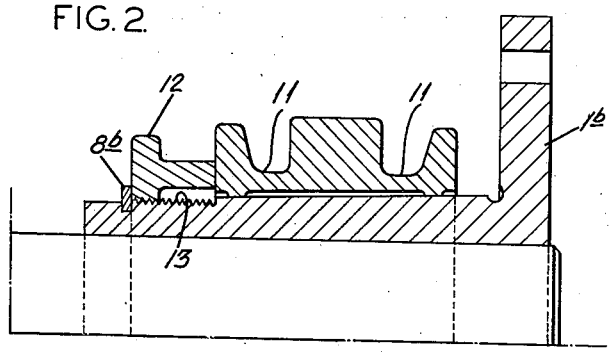
INVENTOR:
KARL ERIK JOHANNES KYLEN
BY Howson & Howson
ATTYS.

Nov. 13, 1962 K. E. J. KYLEN 3,063,743
PRESS FITTING JOINT
Filed Feb. 19, 1959 3 Sheets-Sheet 2

INVENTOR:
KARL ERIK JOHANNES KYLEN
BY Howson & Howson
ATTYS.

Nov. 13, 1962 K. E. J. KYLEN 3,063,743
PRESS FITTING JOINT
Filed Feb. 19, 1959 3 Sheets-Sheet 3

INVENTOR:
KARL ERIK JOHANNES KYLEN

United States Patent Office 3,063,743
Patented Nov. 13, 1962

3,063,743
PRESS FITTING JOINT
Karl Erik Johannes Kylen, Villa Grankulla, Vastra Bodarne, Sweden, assignor to Aktiebolaget Svenska Kullagerfabriken, Goteborg, Sweden, a corporation of Sweden
Filed Feb. 19, 1959, Ser. No. 794,406
13 Claims. (Cl. 287—53)

The present invention relates to a press-fitting joint for shaft-couplings, crankshafts, etc., and has for its object to provide a joint capable of transmitting great torque for interconnecting a pair of relative each other concentric joint members by means of a third member applied within or around one of the interconnected joint members. Another object is to facilitate the assembly and dismounting joints of this kind.

The invention is especially adapted for mounting flange couplings having a hub provided externally with a conical surface or a pair of stepped conical surfaces or flange couplings fixed to the end of a shaft the end of which is formed with a cavity having a conical wall.

By forcing a third member, a pressure sleeve, onto the conical surface of the hub the latter can be compressed to grip the shaft or, alternately, by forcing a plug into the hollow end of the shaft, the latter can be expanded into gripping contact with the hub whereby the members are prevented from turning relative each other when the shaft is subjected to torque.

According to certain forms of the invention a pressure member is forced up onto a simple or stepped conical surface on the hub or into corresponding surfaces in a hollow shaft. The pressure member should contact the hub or shaft at or near its ends. The surfaces of contact which should be conical to fit the corresponding surfaces of the hub or the hollow surface of the shaft should be as narrow as possible without risk of smearing in order to diminish the friction which is created between the contacting surfaces when they are being forced together. The surface between the annular contact surfaces of the pressure member or of the hub or shaft respectively should be relieved to form one or more sealed annular chambers between the hub or shaft and the pressure member respectively. The size of this chamber, which is filled with a pressure medium before the parts are assembled, is of prime importance for the functioning of the device. If there is more than one annular chamber, for instance two, these should preferably be located near the ends of the pressure member, there being a narrow sealing rib located between the outer sides of the member and the respective chambers.

The pressure medium may consist of oil, grease, a plastic or viscous substance such as oil mixed with colloidal clay or graphite or a mixture of a liquid and a mineral or a mineral soap mixed with a suitable fat, e.g. an organic fat in such proportion as to form a pasty or viscous substance with such adherent properties that it can be applied to the pressure member or the hub or both before the former is mounted on the latter.

A suitable medium of this kind is a mixture of cylinder oil and colloidal clay in which the proportion of oil should not be greater than that the mixture will be sufficiently pasty to enable it to be applied to the pressure member or the hub. The use of a pressure medium consisting essentially of finely pulverized solids, has the great advantage that the coefficient of thermal expansion will be substantially less than if a liquid pressure medium is used, wherefore its torque transmitting capacity will remain substantially unaltered at varying temperatures. Further the compressibility of the pressure medium is decreased when a finely pulverized material is mixed with the oil. Another advantage is that if the conical surfaces of the hub or the surfaces of the sealing ribs become scratched so that the liquid in the pressure medium gradually drains off, the solid particles remain in the cavity and prevent any substantial decrease of the diameter of the pressure member. The joint is still capable of transmitting the greater part of its maximum torque and further, even if it does not slide off, the engaging surface of its own accord when being dismounted, the pressure member may, as required, be easily loosened by means of a pair of screws provided for this purpose. The friction between the solid particles remaining in the cavity is comparatively small since a certaain amount of oil is retained by the colloidal clay or graphite or in any other suitable, finely pulverized substance used.

According to the invention, however, the pressure member is made in such a manner that when it is being forced into seating engagement or is being dismounted the pressure medium is prevented from seeping out between the sealing ribs and the conical surface of the inner and outer sealing edges of the sealing ribs. The pressure medium with which the cavity is filled creates very little friction. The force required to seat the ring will be practically equal to the sum of the friction in the sealing surfaces and the axial component of the pressure exerted by the pressure medium, and the force acting to free the ring will be the difference between these two forces. One condition for the correct functioning of the device is that the axial component of the pressure exerted by the pressure medium should be greater than the frictional forces acting between the sealing surfaces. In other words the pressure member should preferably free itself of its own accord when the joint is to be dismounted. This result can be attained by suitable choice of taper of the conical surface. It is important that the ends of the sleeve be correctly dimensioned in order to obtain correct pressure between the sealing surfaces during the assembly operation. Unless the ends of the sleeve are sufficiently resistant to expansion the pressure medium will leak past the sealing ribs when the sleeve is forced onto its seat. The sleeve therefore cannot be forced up onto the hub further than to a certain limit and will slide off of its own accord. Practical tests have shown that if the sleeve and the space for the pressure medium are correctly dimensioned with reference to the character of the pressure medium among other things, the sleeve can be mounted and dismounted without the use of special tools other than those usually to be found in work shops and practically as often as may be required without the necessity of replenishing the pressure medium, if this is a plastic substance such as grease having a suitable penetration number or a paste of some kind. Since the pressure medium is compressible to a certain extent the volume of the above mentioned cavity should be kept as small as possible so that the sleeve will free itself under all circumstances. The depth of the cavity should, on the other hand, not be too small, because if part of the oil does escape there may be some risk of metallic contact between the compression sleeve and the hub. The depth may suitably be between 0.2 and 0.02 mm.

The compression sleeve may for instance be forced onto the hub by a nut engaging a thread on the hub or by screws or a hydraulic tool. The compression sleeve must be locked in place after being located in order to prevent it from sliding off the hub.

Figure 4:
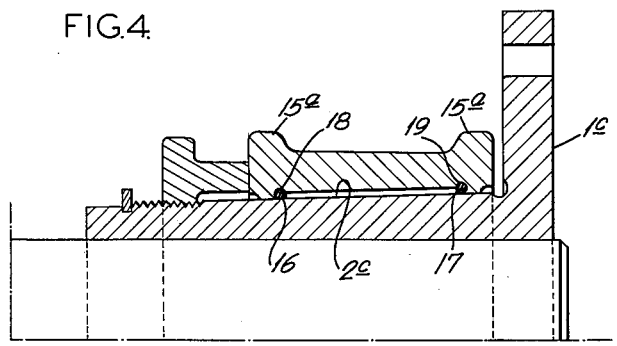
Figure 5:
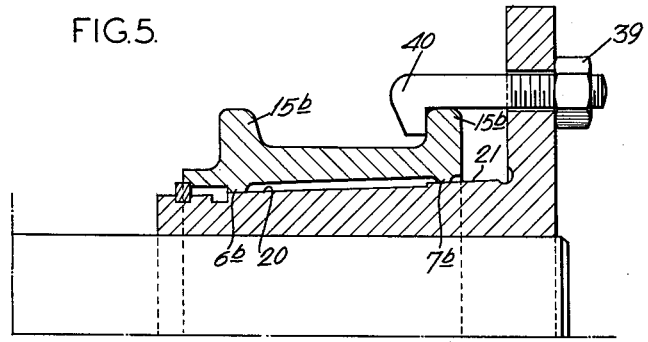
Figure 6:
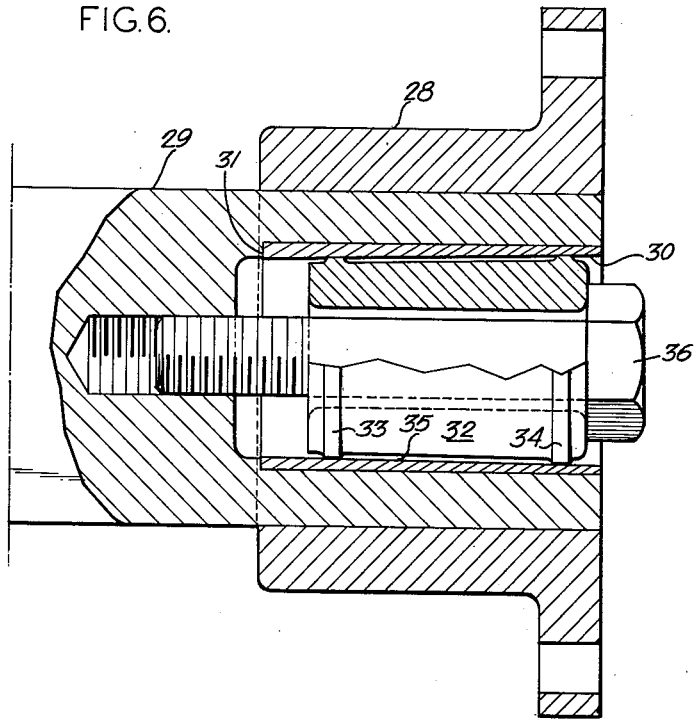
Figure 7:
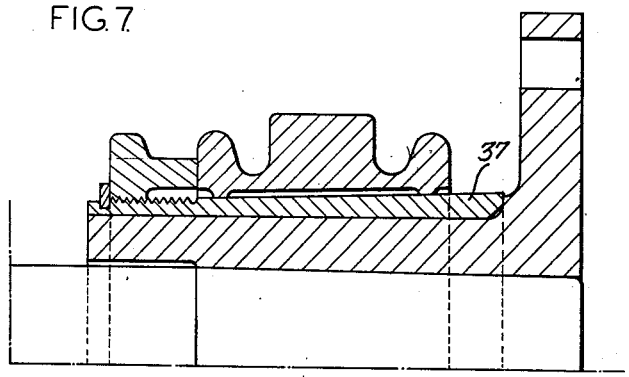

The invention is illustrated in the accompanying drawings in which FIGS. 1 and 1a show a form of a coupling in which increased pressure in the pressure medium is obtained thereby that the compression sleeve is formed to counteract decrease in its diameter between the contact surfaces against the conical hub. FIG. 1 shows the simplest form having a single chamber while FIG. 1a shows a form having a pair of chambers. FIG. 2 shows a joint having another form of compression sleeve. FIG. 3 shows still another form of compression sleeve suitable for use when a plastic pressure medium is introduced into the chamber between the hub and the sleeve. FIG. 4 shows an alternative form of the coupling according to FIGURE 3. FIG. 5 shows a coupling in which the compressive effect is increased through the use of stepped conical surfaces. FIG. 6 shows the the invention applied to a device suitable for use in built-up crankshafts. FIG. 7 shows a compression sleeve mounted on an externally conical thin sleeve which in its turn is mounted on a hub.

In the form of the invention shown in FIGURE 1 a hub 1 having an external conical surface 2 is mounted on a shaft 3. For this purpose a compression sleeve 4 having an internal broad shallow cavity bounded at each side by annular ribs 6 and 7 respectively is mounted on the conical surface 2. The annular chamber 5 between the hub 1 and the compression sleeve 4 and bounded by the ribs 6 and 7 is filled with a liquid or a suitable plastic substance for instance a mixture of oil or grease with a mineral substance, or filled with a suitable grease or a plastic mineral substance such as sodium or the like. When a liquid pressure medium, for example oil, is used, the hub and compression sleeve 4 may be immersed in a vessel containing the liquid and the compression sleeve is then forced onto the hub 1 while the parts are still immersed until metallic contact is obtained between the hub and the sealing surfaces, after which the compression sleeve is locked in this position by means of a locking ring 8 which engages a groove 9 in the hub.

When plastic media or thick liquid such as thick cylinder oil is used the compression sleeve may instead be coated internally with the plastic substance or oil. Alternatively the hub or both the compression sleeve and hub may be coated, after which the sleeve is forced so far onto the conical surface that there is no risk of leakage of the plastic substance or oil and locked in this position by a nut or locking ring or the like. After the hub 1 has been mounted in position on a cylindrical or conical seat on the shaft 3 the compression sleeve is forced further up onto the conical seat of the hub a distance L determined with respect to the angle of taper and the yield point of the material of the sleeve. The locking ring can then be transferred to another groove 27 to retain the compression sleeve in compressive relation with the hub. The compression sleeve 4 is provided with an annular extension 38 which protects the surface of the hub between the grooves 9 and 27 from injury.

FIG. 1a shows an alternative form of the compression sleeve having two annular chambers 23 and 24 located next to the sealing ribs 6a and 7a. In this form of the invention the thickness of the material of the sleeve 4a at its ends should preferably be greater than at its middle so that metallic contact between the ribs 6a and 7a and the hub 1a will be ensured, as otherwise leakage of pressure medium may occur. In this case the middle portion 45 of the compression sleeve expands somewhat more than the edges because a certain amount of pressure medium remains between the sleeve and the hub along the middle portion between the inner edges of the chambers. In this case the coupling retains substantially its whole capacity for transmitting torque even if one of the sealing surfaces is damaged thus causing leakage. Even if leakage does occur, the compression sleeve can easily be dismounted by means of a pair of screws 25 screwed into the flange of the hub 1a. By providing two or more chambers two internal sealing edges are obtained. The sealing pressure between the ribs and the conical surfaces can be varied by varying the width of the ribs. The less the the width of the sealing rib the greater will be the specific pressure between them and the conical surface.

FIG. 2 illustrates a form of the invention having a compression sleeve with rounded annular grooves 11 in its outer surface near the inner edges of the sealing ribs in order to decrease the sealing pressure at the sealing surfaces, whereby the force required to force the sleeve into position will be less and it will slide off more easily. This form of the invention is especially suitable for use with short compression sleeves. In this form the sleeve is forced into place by means of a nut 12 which engages with threads 13 on the hub 1b and which is locked in place by means of a split ring 8b.

FIG. 3 shows still another alternative form of compression sleeve suitable when the pressure medium is a plastic material. If the pressure medium is sufficiently thick and viscous under pressure it will not leak out to any appreciable extent even if there is a small amount of play at 14 between the sealing surfaces until the compression sleeve has been forced into place. When the sealing surfaces of the compression sleeve first contact the conical surface a greater volume of pressure medium is enclosed in the chamber than the final volume of the chamber. In order that metallic contact may be obtained before too much of the surplus pressure medium leaks out the compression sleeve should be provided with reinforcing portions 15 at its ends.

FIG. 4 illustrates an alternative form of the compression sleeve shown in FIG. 3 in order to enable a greater quantity of pressure medium than what corresponds to the theoretical space between the hub and the compression ring to be introduced into the chamber without risk of leakage while the sleeve is being forced into position. As in the form of sleeve shown in FIG. 3 the ends of the sleeve are provided with reinforcements 15a. O-rings 16 and 17 of suitable material are located at the inner sealing edges and their diameters are chosen so that they seal the interstices between the sealing surfaces of the compression sleeve and the conical surface 2c of the hub 1c bfore the former has been brought into position. These O-rings serve as seals at the beginning of this operation. Upon completion of the operation the O-rings have been expanded into grooves 18 and 19 in the sleeve because they expand more than the sleeve due to the fact that the reinforcements 15a at the ends of the sleeve resist expansion of the latter. In this case it is possible to obtain greater expansion of the middle portion of the compression sleeve than at its ends when it has been forced into place.

It is possible to cause the space for the pressure medium to undergo still greater reduction during the application of the compression sleeve by the use of the device shown in FIG. 5. In this case both the hub and the compression sleeve are provided with stepped conical surfaces, whereby an additional piston effect is obtained. When the compression sleeve is forced up onto the hub the expansion thereof will be greater at the middle portion of the sleeve than at its ends. When the hub is provided with a flange the sleeve can be forced into place with the aid of threaded hooked members 40 which engage with one of the reinforcements 15b and are actuated by nuts 39 to pull the sleeve into place.

The sealing surfaces 6b and 7b engage two different conical surfaces 20 and 21 respectively having the same taper. As the sleeve is forced home the volume of the annular chamber diminishes further because of the piston effect. This decrease in volume increases the pressure exerted by the pressure medium whereby the sleeve will be expanded somewhat more than in the forms of the invention previously described. It is clear that in this case the decrease in the volume of the chamber must be accurately calculated to avoid forcing the pressure medium out between the sealing surfaces during mounting. In this case also the compression sleeve should be provided with reinforcements 15b at its outer edges.

The invention can also be applied to shaft couplings in which the necessary press fit is obtained by expanding a hollow shaft.

A shaft coupling of this kind is shown in FIG. 6. The hub 28 of the coupling is mounted on the hollow end of a shaft 29. An internally tapered sleeve 30 is mounted in the shaft and engages a shoulder 31 in the latter. A plug 32 is provided with sealing ribs 33 and 34 leaving a space 35 between the plug 32 and the sleeve 30. The sleeve 30 preferably has a cylindrical outer surface. Before the sleeve 30 is mounted in the shaft a pressure medium is introduced into the annular chamber 35, after which the plug 32 is forced into the sleeve 30 by means of a screw 36, whereby the shaft 29 and the hub 28 are expanded.

The device according to the invention can also be used for making built-up crankshafts, for fixing piston pins, etc. Any of the previously described forms of the invention may be used in connection with the device according to FIG. 6. Further it is also possible to mount an externally tapered thin sleeve 37 on the hub to provide the tapered surfaces as shown in FIG. 7. A sleeve of this kind may be used if the hub is made of a more or less permeable material such as cast iron.

In the figures the chamber has been formed in the pressure member. It is, however, also possible to provide the chamber in the hub or shaft or part of it in each of the members.

Long compression sleeves may suitably be cylindrical or conical externally. Short sleeves may preferably be made as shown in FIGS. 2 and 7.

Since there is no displacement under pressure between the shaft and the hub, the invention makes it possible to introduce carborundum or other suitable substance between these parts, whereby the coefficient of friction will be more than doubled as compared with metallic contact. In order to obtain suitable sealing pressure the edges of the pressure member may be extended beyond the sealing ribs as shown at 10 in FIG. 3, whereby the sealing surfaces will more exactly remain parallel.

In the forms of the invention described having annular chambers between the members of the joint the sleeve will slide off the hub of its own accord when the joint is being dismounted.

In cases where this is not necessary it is possible to dispense with the annular chamber and apply a suitable substance directly between two matching conical surfaces. This substance should be a film-forming substance comprising a non-lubricating component such as colloidal clay or colloidal graphite, a suitable mineral soap such as zinc naphthenate and a lubricant, such as oil, grease or an organic fat. Even if most of the lubricant is forced out of the joint, the non-lubricating substance forms a film which retains a small amount of lubricant and which thus makes it easy to force the members apart.

The invention is not limited to the forms thereof shown in the drawings.

I claim:

1. In a joint for a pair of telescoping members having inner and outer opposed surfaces of rotation respectively adapted to be engaged by a press fit, one of said members having an exposed conical surface coaxial and at least partially coextensive with the opposed engaging surfaces of said joint members, a pressure member operable to be forced into pressure relationship with said conical surface and comprising a sleeve having means contacting said conical surface adjacent each end of said pressure member through a comparatively narrow continuous annular sealing surface portion and forming at least one sealed chamber intermediate the contacting means, and a pressure medium having low internal friction contained in said chamber to cooperate with said contacting means to effect said press-fitted engagement of said telescoping members upon displacement of said pressure member longitudinally of said surface and compression of said pressure medium.

2. A joint according to claim 1 wherein the pressure member extends somewhat beyond the outer edges of the contacting means.

3. A joint according to claim 1 wherein said pressure member is grooved at points inwardly adjacent its ends to provide portions of reduced thickness.

4. A joint according to claim 1 wherein the ends of the pressure member are thicker than its middle portion to provide reinforcement for said contacting means.

5. A joint according to claim 1 wherein said conical surface is an external surface of said joint and said contacting means has sealing surfaces surrounding said conical surfaces and in engagement therewith, including sealing rings of a plastic material positioned adjacent the inner sides of the sealing surfaces, the internal diameter of the sealing rings in a free state being less than the inner diameter of said sealing surfaces.

6. A joint according to claim 1 including locking means operatively connected between said conical surface and said sleeve to prevent the latter from sliding off the surface and to retain the sleeve after the chamber has been filled with pressure medium in a position to insure against leakage of the pressure medium between said contacting means and said surface during handling prior to said longitudinal displacement of said sleeve and compression of said pressure medium.

7. A joint according to claim 6 wherein the locking means comprises a split ring, and an annular groove in one of the joint members to receive said ring and limit reverse displacement of said sleeve to prevent leakage prior to forward longitudinal displacement of said sleeve and compression of said medium, said member having a further annular groove located to receive said locking ring after said forward longitudinal displacement of said sleeve and compression of said medium to retain the compression sleeve in compressive relationship with said conical surface.

8. A joint according to claim 7 wherein the sleeve is provided at its ring-engaging end with an annular extension outwardly of said contacting means, the length of said extension corresponding substantially to the distance between said grooves.

9. A joint according to claim 6 wherein the locking means comprises a threaded fastener disposed axially of said conical surface and operable upon tightening to effect said longitudinal displacement of said sleeve and compression of said medium.

10. A joint according to claim 1 wherein said conical surface is continuous.

11. A joint according to claim 1 wherein said conical surface is stepped.

12. A joint according to claim 1 wherein said pressure medium comprises a film-forming substance containing a non-lubricating component and capable of retaining its film-forming qualities under pressure.

13. A joint according to claim 1 wherein said pressure medium is a plastic pressure medium of sufficiently sticky or pasty consistency as to adhere to the surfaces of the members upon which it is spread.

References Cited in the file of this patent

UNITED STATES PATENTS

| | | |
|---|---|---|
| 2,010,057 | Buckwalter | Aug. 6, 1935 |
| 2,093,092 | McElhany et al. | Sept. 14, 1937 |
| 2,574,773 | Bannister | Nov. 13, 1951 |
| 2,634,144 | Freidman | Apr. 7, 1953 |
| 2,748,461 | Ohlsson | June 5, 1956 |
| 2,764,437 | Bratt | Sept. 25, 1956 |

FOREIGN PATENTS

| | | |
|---|---|---|
| 725,210 | Great Britain | Mar. 2, 1955 |